United States Patent [19]

Gerboth et al.

[11] 4,294,082
[45] Oct. 13, 1981

[54] HYDRAULIC BLOWER SYSTEM FOR VEHICLES

[75] Inventors: Patrick L. Gerboth, Concord Township, Lake County; Charles W. Thompson, Willoughby, both of Ohio

[73] Assignee: SGM Co., Inc., Mentor, Ohio

[21] Appl. No.: 20,075

[22] Filed: Mar. 13, 1979

[51] Int. Cl.³ .............................................. B60H 3/04
[52] U.S. Cl. ...................................... 62/244; 98/2.11
[58] Field of Search ...................... 62/244; 98/2, 2.11; 417/405, 374

[56] References Cited

U.S. PATENT DOCUMENTS

| | | | |
|---|---|---|---|
| 3,104,530 | 9/1963 | Teichert | 60/53 |
| 3,424,236 | 1/1969 | Hergott | 62/244 X |
| 3,477,637 | 11/1969 | Johnson | 417/374 X |
| 3,844,130 | 10/1974 | Wahnish | 62/244 |
| 3,874,191 | 4/1975 | Hudson | 60/426 |
| 3,918,270 | 11/1975 | Dixon et al. | 62/244 X |
| 3,942,486 | 3/1976 | Kirchner | 123/41.12 |
| 4,038,835 | 8/1977 | Amieri | 98/2.11 |
| 4,062,329 | 12/1977 | Rio | 123/41.12 |
| 4,066,047 | 1/1978 | Vidakovic et al. | 123/41.12 |
| 4,069,972 | 1/1978 | Hausmann | 60/456 X |

OTHER PUBLICATIONS

Publication, "Vehicular Blowers, Heaters, Air Conditioners" Brochure of SGM Company, Inc., 1975.

Primary Examiner—Daniel M. Yasich
Attorney, Agent, or Firm—Maky, Renner, Otto & Boisselle

[57] ABSTRACT

The present invention is directed to an improved blower system particularly useful for vehicles wherein the one or more fans, squirrel cage blowers or the like are driven by a hydraulic motor which is powered directly from the hydraulic system of the vehicle. Thus, the blower system of the present invention may draw on such hydraulic power without presenting any substantial drain on the hydraulic system or on the vehicle engine. For equal physical size motors, the hydraulic motor typically has an increased output capacity over conventional DC electric motors previously employed in such blower systems. Moreover, the hydraulic motor is continuously lubricated by hydraulic fluid flowing therethrough so that there is minimal wearing of the parts thereof with the end result that the life expectancy will ordinarily equal or exceed that normally expected for a typical vehicle.

6 Claims, 4 Drawing Figures

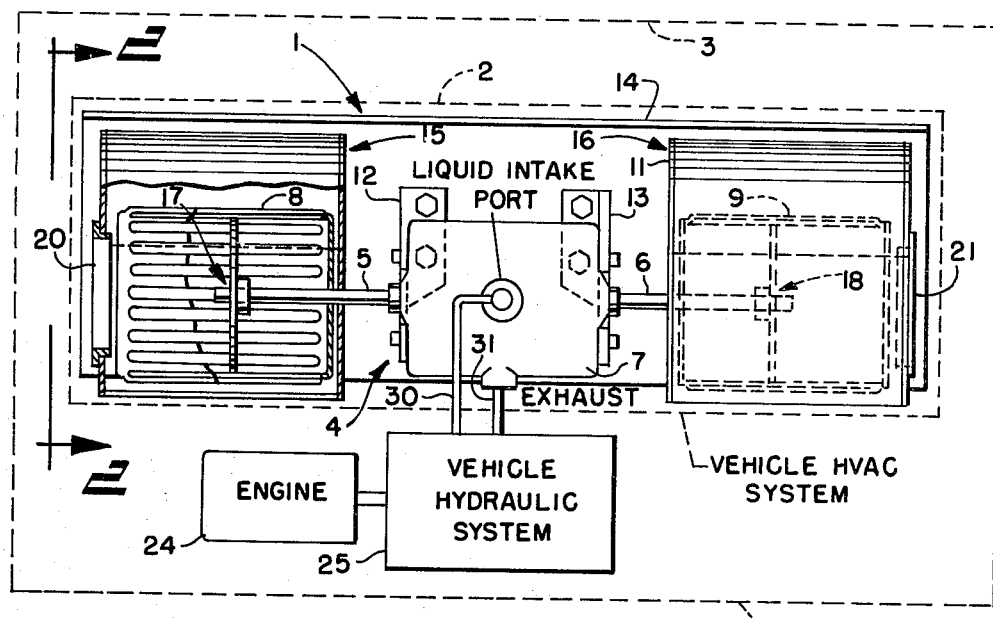
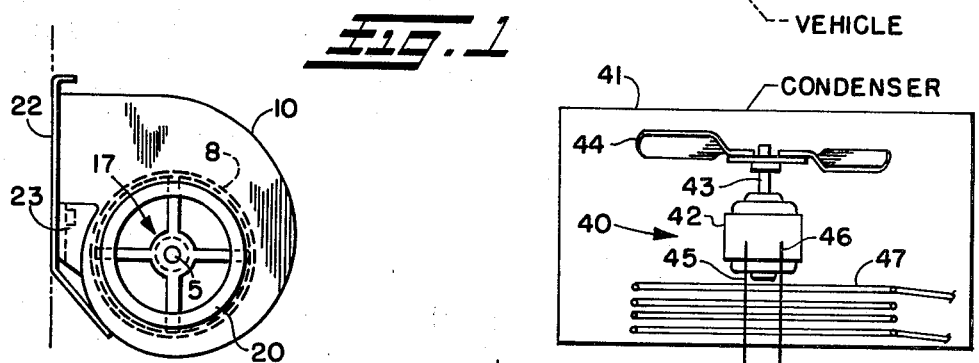
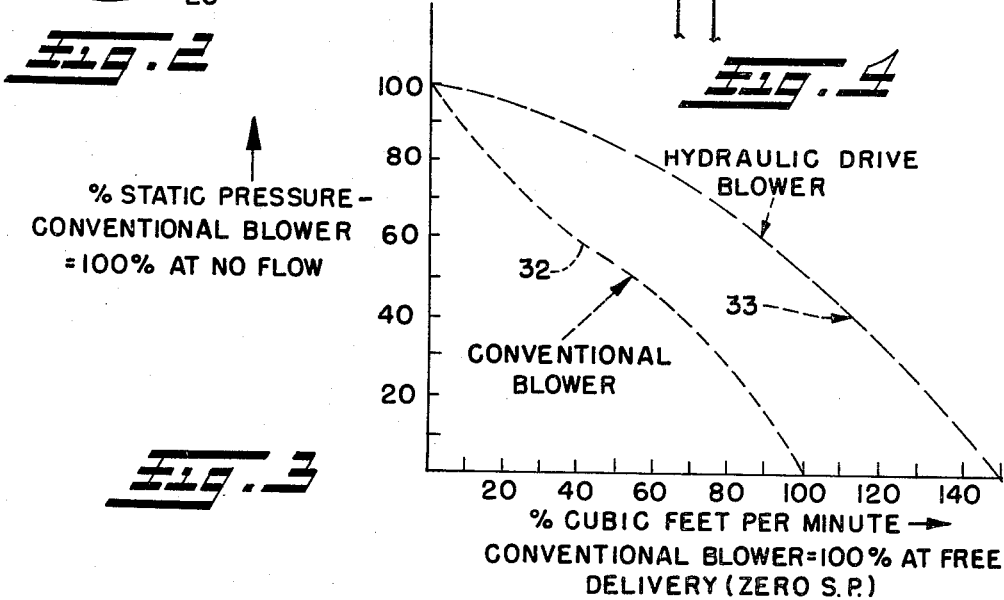

HYDRAULIC BLOWER SYSTEM FOR VEHICLES

TECHNICAL FIELD

The present invention relates generally, as indicated, to hydraulic blower systems and, more particularly, to such systems for use in vehicles in connection with the heating, ventilating, air conditioning, and/or pressurizing systems therefor.

BACKGROUND OF PRIOR ART

Blower systems have been used in connection with heating, ventilating, air conditioning, and/or pressurizing systems for vehicles. Typically, such blower systems have one or more fans, squirrel cage blowers, or the like, which are turned at relatively high velocity to blow air into the vehicle operator's station or cab, for example, for ventilating and/or pressurizing purposes. Sometimes the air is blown proximate heating or cooling coils before entering the cab for heating or cooling the latter. Electric motors have been used to turn the fans, blowers and the like.

However, such electric motors have encountered a number of problems. With the increasing size of the vehicle cab, the capacity of the blower system, including the motor thereof, increases, thus resulting in a substantial electrical drain on the vehicle battery and/or electric power generating system as well as requiring an unnecessary increase in the size, weight and cost of such parts and support structure therefor and/or the output capacity of the vehicle engine. Moreover, such electric motors often require service or maintenance, including lubricating, cleaning, and the like, and, even so, frequently have a useful life expectancy, i.e. about 3,000 hours, that is shorter than the total vehicle life due to wear out of brushes, insulation, etc., thus requiring periodic replacement. Compounding these maintenance problems is the dirt which may enter the motor and cause excessive wear, for although the input air may be filtered, it is not uncommon for dirt to gain access to the motor, especially when the filters are dirty. The wearing out of the fixed supply lubrication to motor bearings, and commutator arcing further reduce the life expectancy of such motors.

One example of a prior blower system for a vehicle employs a DC electric motor having a double output shaft, one on each side of the motor, for turning two squirrel cage blowers simultaneously. The manufacturing tolerances for such a DC motor must be maintained relatively close for quiet, effective, and efficient operation. However, a certain amount of bending torque may be applied to the drive shafts by the weight of the respective blowers mounted and/or turned thereby, which may cause excessive wear on the various parts of the motor, including particularly the sealed bearings thereof. Alternatively, if the bearings are not sealed, they may reqire relatively frequent lubricating to avoid excessive wear.

BRIEF SUMMARY OF INVENTION

The present invention is directed to an improved blower system particularly useful for vehicles wherein the one or more fans, squirrel cage blowers or the like are driven by a hydraulic motor. For equal physical size motors, the hydraulic motor typically has an increased output capacity over conventional DC electric motors previously employed in such blower systems. Thus, the hydraulic blower system of the present invention may have a significantly increased output capacity. Moreover, the hydraulic motor is continuously lubricated by hydraulic fluid flowing therethrough so that there is minimal wearing of the parts thereof with the end result that the life expectancy will ordinarily equal or exceed that normally expected for a typical vehicle. Hydraulic motors ordinarily will have a higher reliability than DC electric motors because the former will have fewer parts and more easily maintained manufacturing and operating tolerances.

According to the preferred embodiment and best mode of the present invention, the blower system includes one or more fans, blowers, or the like rotated by a hydraulic motor which is powered directly from the hydraulic system of the vehicle. In this regard, most modern vehicles having pressurized hydraulic systems, for example for operating peripheral equipment, such as tractor plows, booms, shovels, and the like, ordinarily have an excess hydraulic capacity above and beyond that required to operate such peripheral equipment. Thus, the blower system of the present invention may draw on such hydraulic power without presenting any substantial drain on the hydraulic system or on the vehicle engine.

The present invention may be employed with both large and small blowers, those having single or multiple air inlets with one or more housings, and various loads having substantially lower starting torque requirements than those at the continuous operation point. The blower system may be employed in a variety of vehicles, such as agricultural equipment, including tractors with cabs, trucks, heavy cranes, heavy tractors, back hoes, etc. for heating, ventilating, air conditioning, and/or pressurizing uses therein.

With the foregoing in mind, it is a primary object of the present invention to provide a blower system, particularly a hydraulic blower system, for use in vehicles that is improved in the noted respects.

Another object is to improve the life expectancy of a vehicle blower system.

An additional object is to increase the output capacity of a vehicle blower system without enlarging the physical size of the motor therefor.

A further object is to provide adequate blower capacity for a vehicle while minimizing or eliminating the electric draw on the vehicle battery and/or electric power generating system to operate such blower system.

Still other objects include minimizing servicing and maintenance of vehicle blower systems, improving the reliability of vehicle blower systems, and providing for driving loads having substantially lower starting torque requirements than those at the continuous operation point.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail certain illustrative embodiments of the invention, these being indicative, however, of but several of the various ways in which the principles of the invention may be employed.

BRIEF DESCRIPTION OF THE DRAWING

In the annexed drawing:

FIG. 1 is a front elevation view, partly broken away in section, of a hydraulic blower system in accordance with the present invention as employed in a schematically illustrated vehicle;

FIG. 2 is an end view of the blower system looking generally in the direction of the arrows 2—2 of FIG. 1;

FIG. 3 is a graphical representation of the output characteristics of a conventional vehicle electric blower system and the hydraulic blower system of the present invention showing the improved volume capacity characteristics of the invention; and FIG. 4 is an end elevation view of a condenser employing a modified form of hydraulic blower system in accordance with the present invention in association with the air conditioning system of a vehicle, such condenser being mounted on the vehicle roof.

DESCRIPTION OF THE PREFERRED EMBODIMENTS

Referring now in detail to the drawing, and initially to FIGS. 1 and 2, a hydraulic blower system in accordance with the present invention is generally indicated at 1 in association with the heating, ventilating and air conditioning system 2 of a vehicle 3. The hydraulic blower system includes a hydraulic motor 4, such as a conventional hydraulic motor, having plural output shafts 5, 6 extending from the motor housing 7, and a pair of conventional squirrel cage blowers 8, 9, which are positioned in conventional blower housings 10, 11. The motor housing 7 is mounted by brackets 12, 13 on the blower system housing 14, and the over all blower system housing is mounted with respect to the heating, ventilating, air conditioning and/or pressurizing system 2 of the vehicle 3 to blow air into the vehicle cab, for example, for heating, ventilating, air conditioning and/or pressurizing purposes, as is well known.

Each of the individual blowers 15, 16 driven by the hydraulic motor 4 preferably is substantially the same. The squirrel cage blowers 8, 9 preferably are directly mounted on the shafts 5, 6 by securing means 17, 18 and preferably are not otherwise supported, thereby avoiding the need for additional bearings. Moreover, since the motor 4 is of the hydraulic type, it is self-lubricating so that the internal support mechanism for the shafts 5, 6, such as bearings or the like, will have an extremely long life without requiring frequent servicing, maintenance or the like. Each of the blowers 15, 16 has an air inlet 20, 21 and an air outlet, such as that shown at 22 in FIG. 2, and each of the blower housings 10, 11 is mounted by bolts or the like, such as that shown at 23 in FIG. 2, to the blower system housing 14 for support thereby.

The vehicle 3, of course, includes an engine 24, such as an internal combustion engine or other prime mover, which provides mechanical power for the vehicle to drive the same and/or the vehicle hydraulic system 25, which includes a hydraulic pump that develops pressurized hydraulic fluid and work output to operate one or more hydraulically responsive systems associated with the vehicle. The vehicle hydraulic system 25, and particularly the pump output and/or accumulator and reservoir thereof are coupled by intake or input line 30 and exhaust or return line 31 to the hydraulic motor 4 to operate the same. Thus, in response to fluid flow through the lines 30, 31, the motor 4 will turn the blowers 8, 9 at a satisfactorily high velocity to effect sufficient blower output from the hydraulic blower system 1 to obtain the desired heating, ventilating, air conditioning and/or pressurizing of the vehicle cab, for example.

The hydraulic motor 4 ordinarily would be relatively small in comparison to the size, capacity, and input requirements of other hydraulic equipment operated by the vehicle hydraulic system 25. For example, the motor 4 may require only about 200 psi pressure to operate the same and a flow rate of approximately 6 gallons of hydraulic fluid per minute. Such a hydraulic motor ordinarily would be somewhat larger in horsepower rating than a 1/5 horsepower DC electric motor, which is typically used in vehicle blower systems. For a hydraulic motor and a DC electric motor of the same physical size, though, the hydraulic motor ordinarily will have a larger horsepower capacity than the electric motor. Therefore, the capacity of the hydraulic blower system 2 in accordance with the present invention will be larger than that of a similar electrically driven blower system.

Referring briefly to FIG. 3, the improved operating characteristics and, particularly, output capacity expected from a hydraulic blower system 2 in accordance with the present invention using a hydraulic motor 4 that is the same physical size as a 1/5 horsepower DC electric motor driven blower system is illustrated. The dashed line 32 depicts the operating characteristics of a blower system similar to that shown in FIG. 1 but employing a 1/5 horsepower DC electric motor. The solid line 33 depicts the expected operating characteristics of the blower system 2 employing a hydraulic motor 4 that is the same physical size as the 1/5 horsepower DC electric motor but having a larger horsepower rating than such electric motor. Over the operating curve illustrated in FIG. 3, the hydraulic blower system of the present invention will have improved operating characteristics including about 50-100% volumetric output capacity over that of a conventional electric blower system.

In operation of the hydraulic blower system 2, the hydraulic motor 4 will, in response to hydraulic fluid pressure from the vehicle hydraulic system 25, rotate the blowers 8, 9. Ordinarily filtered air is drawn into the inlets 20, 21 and is blown from the air outlets, such as that shown at 22 in FIG. 2, either directly into the vehicle or over heating or cooling coils associated with the vehicle heating and/or air conditioning system.

Turning briefly to FIG. 4, a modified hydraulic blower system is illustrated at 40 in association with a roof top mounted condenser 41 for a vehicle air conditioning system. The hydraulic blower system 40 includes a hydraulic motor 42 which has an output shaft 43 on which a fan 44 is mounted for rotation by the motor. Fluid intake and return lines 45, 46 couple the motor 42 with the vehicle hydraulic system to energize the motor to rotate the fan blowing air across or proximate condenser coils 47. The hydraulic blower system 40 is mounted in the condenser housing and, thus, are considered in the vehicle, as are the coils 46, and the latter are coupled in conventional manner to air conditioning equipment in the vehicle. Operation of the modified hydraulic blower system 40 is substantially the same as that of the hydraulic blower system 2 described above with reference to FIGS. 1 and 2. Moreover, the operating characteristics and advantages of the hydraulic blower 40 over conventional electrically driven condenser blower systems will be similar to those described above with reference to the hydraulic blower system 2.

STATEMENT OF INDUSTRIAL APPLICATION

In view of the foregoing, it will be appreciated that the present invention provides an improved blower system for heating, ventilating, air conditioning, and/or pressurizing systems for vehicles or the like.

We claim:

1. For a vehicle including a hydraulic system for operating hydraulic equipment associated with the vehicle, and a prime mover for driving the hydraulic system to provide work thereto, the improvement comprising hydraulic blower means for blowing air in the vehicle to circulate air therein, and means for coupling hydraulic fluid of the hydraulic system to said hydraulic blower means to operate said hydraulic blower means to blow air in the vehicle; said hydraulic blower means including a hydraulic motor having an output shaft on one side of said hydraulic motor and another output shaft on an opposite side of said hydraulic motor and blower means for blowing air, said output shafts being commonly rotated, said blower means including a separate squirrel cage blower mounted on each of said output shafts, and blower housing means about said squirrel cage blowers for at least partly covering said squirrel cage blowers; the vehicle including an air conditioning system having a condenser with a condenser coil, said hydraulic blower means being mounted with respect to the condenser to circulate air over the condenser coil; said output shafts providing the sole support for said squirrel cage blowers; said blower housing means having inlet means and outlet means for air flow with respect thereto; and further comprising blower system housing means for supporting said hydraulic motor and said blower housing means in the vehicle.

2. For use in an air conditioning system having a condenser with a condenser coil, a heating system, a ventilating system and/or a pressurizing system for a vehicle, including a hydraulic system for operating hydraulic equipment associated with the vehicle and a prime mover for driving the hydraulic system to provide work thereto, the improvement comprising; hydraulic blower means for blowing air in the vehicle to circulate air therein, and means for coupling hydraulic fluid of the hydraulic system to said hydraulic blower means to operate said hydraulic blower means to blow air in the vehicle; said hydraulic blower means including a hydraulic motor having an output shaft on one side of said hydraulic motor and another output shaft on an opposite side of said hydraulic motor and blower means for blowing air; said output shafts being commonly rotated, said blower means including a separate squirrel cage blower mounted on each of said output shafts, and blower housing means about said squirrel cage blowers for at least partly covering said squirrel cage blowers; said hydraulic blower means being mounted with respect to at least one of said systems to blow air therein; said output shafts providing the sole support for said squirrel cage blowers; said blower housing means having inlet means and outlet means for air flow with respect thereto; and further comprising blower system housing means for supporting said hydraulic motor and said blower housing means in vehicle.

3. The improvement of claim 1 or 2, wherein the prime mover is the vehicle engine, and said hydraulic blower means is operable directly in response to hydraulic fluid from the hydraulic system and independently of the vehicle engine.

4. The improvement of claim 1 or 2, wherein the vehicle includes a compartment for the vehicle operator, and further comprising means for coupling air blown by said hydraulic blower means to the compartment.

5. The improvement of claim 1 or 2, said hydraulic motor having a larger power capacity than that of a same physical size electric motor.

6. The improvement of claim 5, wherein the maximum flow capacity of said hydraulic blower means during normal operation exceeds by about 50 to 100% the maximum flow capacity of a blower system driven by such an electric motor and wherein such electric motor and said hydraulic motor are of about the same physical size.

* * * * *